(12) United States Patent
Rowley et al.

(10) Patent No.: US 6,270,125 B1
(45) Date of Patent: Aug. 7, 2001

(54) MOLDED TUBING ASSEMBLIES

(75) Inventors: William W. Rowley, Chagrin Falls; Richard T. Seman, Newbury, both of OH (US)

(73) Assignee: Mercury Plastics, Inc., Middlefield, OH (US)

( * ) Notice: Subject to any disclaimer, the term of this patent is extended or adjusted under 35 U.S.C. 154(b) by 0 days.

(21) Appl. No.: 09/413,448

(22) Filed: Oct. 6, 1999

(51) Int. Cl.$^7$ .................................................. F16L 33/02
(52) U.S. Cl. ..................... 285/242; 285/256; 285/179; 285/133.11
(58) Field of Search ................................. 285/242, 256, 285/259, 179, 239, 133.41

(56) References Cited

U.S. PATENT DOCUMENTS

| | | | |
|---|---|---|---|
| 3,850,459 | * 11/1974 | Blumenkranz et al. | 285/179 |
| 4,635,972 | * 1/1987 | Lyall | 285/242 |
| 4,712,809 | * 12/1987 | Legris | 285/239 |
| 4,995,645 | * 2/1991 | Pausch | 285/179 |
| 5,378,023 | 1/1995 | Olbrich . | |
| 5,411,300 | * 5/1995 | Mitsui | 285/133.11 |
| 5,551,735 | 9/1996 | Takayanagi . | |
| 5,597,186 | 1/1997 | Ridenour . | |
| 5,707,087 | 1/1998 | Ridenour . | |
| 5,735,554 | * 4/1998 | Imgram | 285/242 |
| 5,772,262 | * 6/1998 | Dupont | 285/242 |
| 5,775,740 | 7/1998 | Fukaya . | |
| 5,829,795 | 11/1998 | Riesselmann . | |
| 5,832,588 | 11/1998 | Ridenour . | |
| 5,833,278 | 11/1998 | Rianda . | |
| 5,853,202 | * 12/1998 | Li et al. | 285/256 |
| 5,984,376 | * 11/1999 | Lampe | 285/256 |
| 6,050,608 | * 4/2000 | Hattttori et al. | 285/242 |
| 6,145,892 | * 11/2000 | Weber | 285/259 |

FOREIGN PATENT DOCUMENTS

220055 * 8/1957 (AU) .................................. 285/242

* cited by examiner

*Primary Examiner*—Teri Pham Luu
(74) *Attorney, Agent, or Firm*—Buckingham, Doolittle & Burroughs, LLP

(57) ABSTRACT

An assembly (110) for joining at least two tubes (12, 14) is provided by a connector (112), a plurality of linear inserts (20) and a plurality of ring members (30). Each of the tubes (12, 14) has a tube end (16) and an internal conduit (18). The connector (112) has a central portion (115) with an internal conduit (118) having a permanently formed feature (119) therein, and a plurality of arms (117). Each arm (117) extends from the central portion (115) and terminates in an arm end (116), such that there is one arm (117) and one arm end (116) paired with each tube end (16). The internal conduit (118) of the connector (112) extends through the arms (117) to the respective arm ends (116). There is one linear insert (20) for each arm end/tube end pair. A first nipple portion (24a) of each linear insert (20) has an external surface frictionally engaged in an internal surface of the connector internal conduit (118) at the arm end (116) and a second nipple portion (24b) has an external surface frictionally engaged in an internal surface of the tube internal conduit (18) at the tube end (16). One ring member (30) is slidingly received along each tube end (16) or arm end (116) atop one of the linear inserts (20) frictionally engaged therein. The ring member (30) compressively deforms the respective tube end or arm end onto the linear insert (20), joining the connector internal conduit (118) to the tube internal conduit (18) in a leak-free manner.

16 Claims, 2 Drawing Sheets

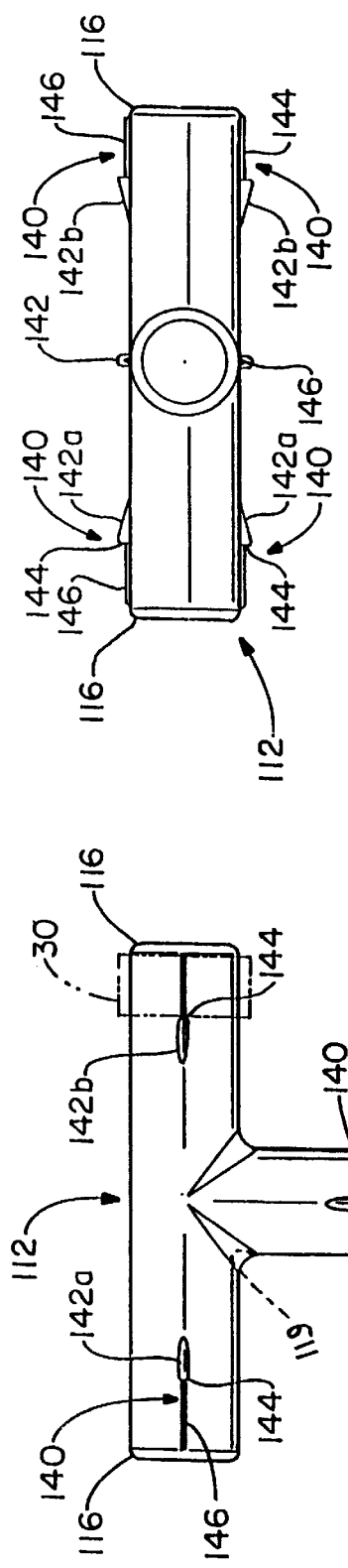
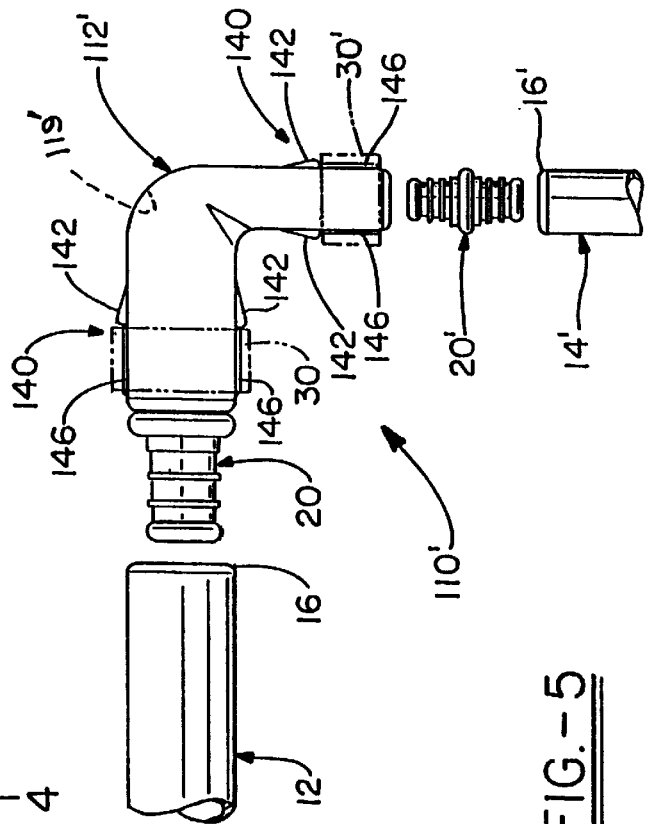

MOLDED TUBING ASSEMBLIES

The present invention relates to a tubing assembly having at least two molded tubes, each of the tubes having an end, with the respective ends on the tubes being connected through a molded connector having an internal conduit or flow path with a permanently formed feature therein. In some embodiments, the feature will be an angular diversion, such as a 90° bend or elbow. In other embodiments, the feature may be an increase or decrease in the internal diameter of the connector, as in a piece generally known as a reducer, whether the internal conduit is straight or has an angular diversion. In a third embodiment, the permanently formed feature is an intersection into the conduit, as would be found in a "T" connector. More particularly, the invention relates to such a tubing assembly where an insert comprising a pair of nipples is inserted into the internal conduits of the tube end and the connector. A compressive element is then placed on each tube end or connector end to compressively deform the tube end or connector end between the compressive element and the nipple, forming a leak-tight seal. Even more particularly, the tubes and connectors are formed from a polymeric material, especially a crosslinkable polyethylene. In the preferred embodiments, the tube ends and connector ends are provided with a stop element and a retaining element to properly seat the compressive element before it is placed into deforming engagement, thereby further facilitating assembly.

BACKGROUND OF THE INVENTION

The connection of various pieces of tubing, particularly polymeric tubing, in a variety of configurations is well-known in the construction of many appliances and many plumbing applications. When such pieces of polymeric tubing are attached to each other to form a tubing assembly, it has been known to attach flexible pieces of such tubing using a crimp ring to compress the tubing ends deformably down against a rigid insert in the internal conduit in the tubes. This use of crimp rings is particularly well known in association with elastomeric hose or tubing, where the material possesses sufficient elasticity to be deformed without breaking. When a connector having a permanently formed feature in the internal conduit (such as a bend, reducer or intersection) has been required, the prior art has made these connectors out of metal, especially brass or copper, or a rigid polymeric material, especially a thermoplastic. In either of these cases, the relative non-deformability of the connector ends effectively precludes the connector end from being deformably compressed between a compressive element fitted around the outer circumference of the connector end and a rigid nipple-like element inserted into the internal conduit. Conversely, the manufacture of connectors from a material having the requisite elasticity to be compressively deformed into a leak-tight seal has been unknown, because such a material generally lacks the rigidity to be permanently formed into the required feature in the internal conduit while withstanding the forces generated from containing fluid under pressure. In contrast to the elastomeric hose-type materials, the thermoplastic or thermoset materials previously known which are used in straight runs of tubing can translate the forces into solely radial components and can effectively handle the pressure, but can only tolerate being bent around a gentle large radius. If such tubing is to be permanently formed into an "L", "T" "Y", "X", a reducing connector, or the other shapes required of connectors in everyday tubing applications, the material will lack the deformability necessary to be compressed between a crimp ring and an insert.

If a polymeric connector could be formed from the same material as the straight runs of the tubing in a tubing assembly and be attached to the tubing ends using the same inserts and compressive elements used to attach the straight runs to each other, the construction of such tubing assemblies would be greatly enhanced, as will be the aesthetic appeal of the product. This is an advantage provided by the present invention.

SUMMARY OF THE INVENTION

This and other advantages of the present invention are provided by the present invention, which comprises a tubing assembly, comprising at least two tubes, a connector, a plurality of linear inserts and a plurality of ring members. Each tube has a tube end and an internal conduit. The connector is for joining the at least two tubes.

The connector comprises a central portion with an internal conduit having a permanently formed feature therein, and a plurality of arms. Each of the arms extends from the central portion and terminates in an arm end, such that there is one arm and arm end paired with each of the tube ends, with the connector internal conduit extending through the arms to the respective arm ends. The linear inserts are provided such that there is one linear insert for each pair comprising an arm end and the corresponding tube end. A first nipple portion of each linear insert has an external surface frictionally engaged in an internal surface of the connector internal conduit at the arm end. A second nipple portion of each linear insert has an external surface frictionally engaged in an internal surface of the tube internal conduit at the tube end. The plurality of ring members are such that one ring member is slidingly received along each tube end or arm end atop one of the linear inserts frictionally engaged therein, the ring member compressively deforming the respective tube end or arm end onto the linear insert, joining the connector internal conduit to the tube internal conduit in a leak-free manner.

In the preferred embodiments, the permanently formed feature of the connector is selected from the group consisting of an angular diversion, an intersecting conduit, a smooth reduction of the internal and external diameters, and any combination thereof.

In the preferred embodiments, the connector is molded unitarily from a polymeric material, especially a crosslinkable polymeric material. Most particularly, a preferred material is polyethylene.

In some embodiments, the connector will have two arms. In other embodiments, it will have three arms, especially arranged in a "T" shape or a "Y" shape. In other embodiments, the connector has four or more arms.

In some embodiments, at least one of the at least two tubes is an arm of a further connector.

In some embodiments, the connector is a linear reducer. In other embodiments, the connector is a reducing elbow.

BRIEF DESCRIPTION OF THE DRAWINGS

A better understanding of the present invention will be had when reference is made to the accompanying drawings, wherein identical parts are identified by identical reference numerals and wherein:

FIG. 3 shows an side view of a novel connector of the present invention;

FIG. 4 shows a front view of the connector of FIG. 3; and

FIG. 5 shows an exploded view of an alternate embodiment of the tubing assembly of the present invention.

DETAILED DESCRIPTION OF THE PRESENT INVENTION

Figure 1:
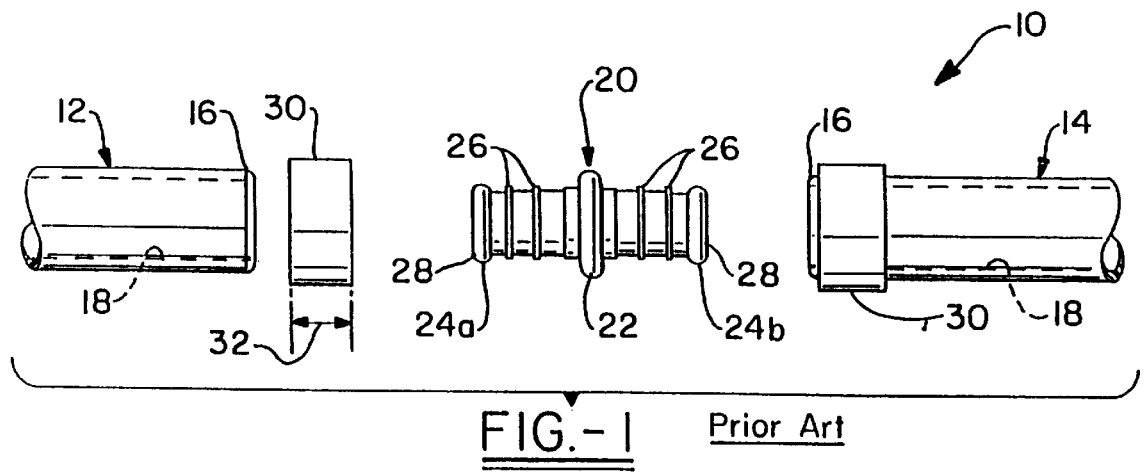
FIG. 1 shows an exploded view of a tubing assembly as known in the prior art.

FIG. 1 shows a prior art tubing assembly 10. The assembly 10 comprises first and second straight tubes 12, 14, each of which has at least one tube end 16, which provides access to an internal conduit 18 in each tube 12, 14. Tubes 12, 14 are well known in the prior art, and can be formulated from a variety of materials, including thermoplastic materials. In the most common cases, the internal conduit 18 will be smooth and otherwise unremarkable. For each of the tubes 12, 14, the internal conduit 18 has an inner diameter and the tube itself has an outer diameter, the differences between the inner and outer diameters representing a wall thickness for the tube.

Figure 2:
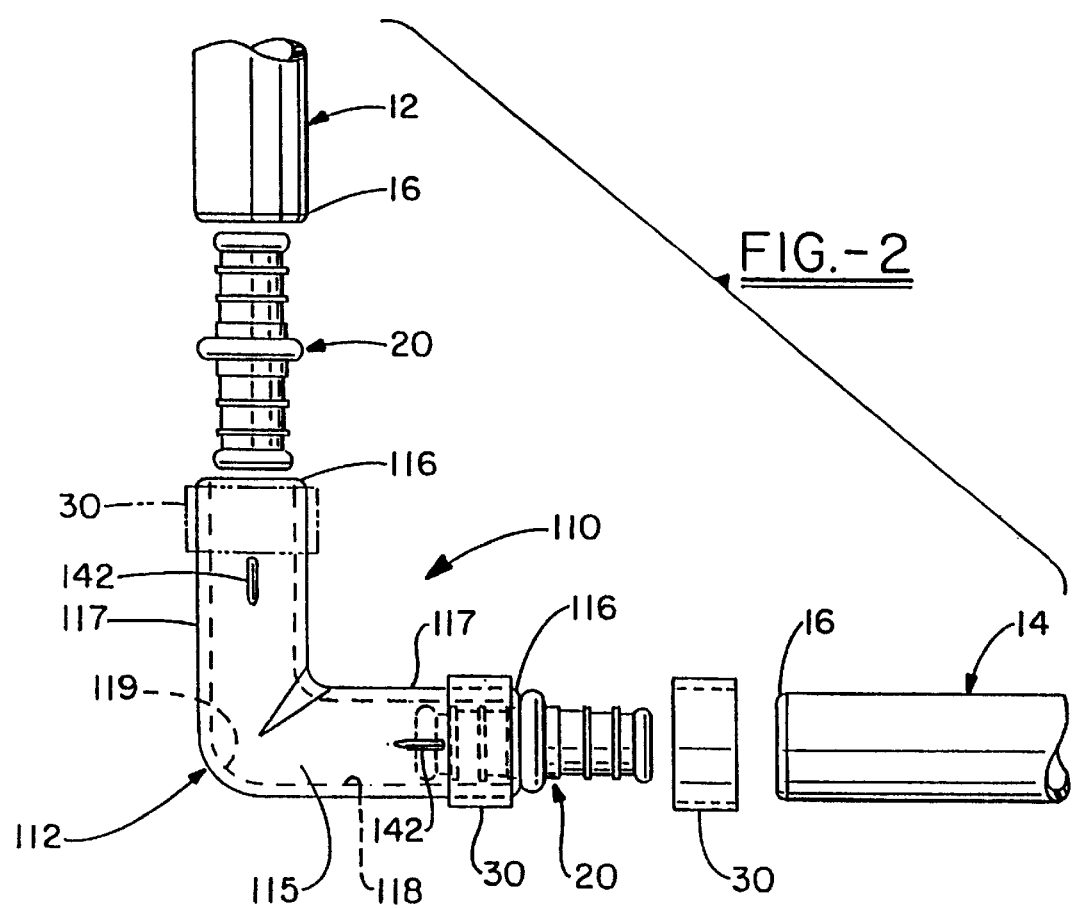
FIG. 2 shows an exploded view of a tubing assembly of the present invention.

As also known in the prior art, an insert 20 is used to connect the tube ends 16 of tubes 12, 14. The particular insert 20 shown in FIG. 1 has a central bulbous portion 22, with identical first and second nipple portions 24a, 24b extending away from the bulbous portion. Other inserts 20, not shown but known in the prior art, would have one nipple portion 24 with a larger diameter than the other or have the two nipple portions 24 aligned at an angle to each other. The exterior surface of the nipple portions 24a, 24b will generally be provided with circumferential ribs 26 of slightly larger diameter and the distal end of each nipple portion will generally have a collar 28 of even a slightly larger diameter. The interior surface of the insert 20 is generally smooth and otherwise unremarkable. The nipple portion 24a or 24b may be inserted into the tube end 16 in a slight interference fit due to the external diameter of the ribs 26 and collar 28. This slight interference fit will retain the insert 20 loosely in the tube end 16, although it may be removed easily if desired. The central bulbous portion 22, having a larger external diameter than the internal diameter of the tube 12, 14 at tube end 16, provides a stop when it abuts against the tube end 16. While FIG. 2 shows the present invention rather than the prior art, it is illustrative of this concept where it shows insert 20 inserted into connector end 116.

A crimp ring 30 for a particular fitting is characterized by two specific dimensions. An internal diameter of the ring 30 is sufficiently larger than the external diameter of the tube 12, 14 that the ring will generally slide freely along the length of the tube. The ring 30 will have a external diameter effectively defined by the desired wall thickness and the internal diameter. The ring 30 will have an axial length 32 long enough to provide an ample surface for applying a crimping tool, but preferably not longer than a distance between the central bulbous portion 22 and the collar 28 on the insert 20. This fit is again best illustrated in FIG. 2, where a present invention connector end 116 is involved. When the ring 30 and insert 20 are properly positioned on a tube end 16 and the internal diameter of the ring is reduced by deformation from a crimping tool or the like, the ring, the tube end 16 is compressively deformed onto the nipple portion 24, effectively securing the collar 28 within the tube end.

When properly assembled, a slight amount (approximately ⅛-inch) of the tube end 16 beyond the ring 30 is exposed, as is generally shown on tube end 16 of tube 14 in FIG. 1. A properly assembled crimp ring/tube/fitting assembly will withstand considerable internal pressure and provides an attractive method of attaching tubing pieces together, as evidenced by its popularity. Both the crimp ring 30 and the insert 20 will be preferably formed from a metal such as copper or brass, although it is possible to use a rigid plastic material, especially a thermoplastic, for the insert and it is known in the art to use a crimp ring 30 which is polymeric. In this latter case, the crimp ring 30 has a normal or relaxed internal diameter which is smaller than the external diameter of the tube end 16. Such a polymeric ring 30 can have its internal diameter temporarily expanded with an expander tool and the ring can be placed on the tube end 16 while in this expanded state. As the polymer relaxes back to its smaller internal diameter, the compressive force exerted on the tube end 16 deforms the tube end onto the corresponding nipple portion 24.

From the foregoing description, it will be understood that the same tube joining technique shown at tubes ends 16 of tubes 12, 14 could be performed at a second end of either one of the tubes 12, 14, in which case a short straight length of the tube connected at each end to the other tubes would effectively define a connector having arm ends where ring members 30 would compressively deform the arm ends onto the insert 20, joining an internal conduit in the connector to the internal conduit in the tubes in a leak-free manner. However, it has been unknown in the prior art to be able to form a connector from the same material as the tubes while imposing a permanently formed feature, such as an angular diversion of the connector internal conduit, an intersection or a reduction of diameter, while retaining the ability to join the connector to the tubes in a leak-free manner by compressively deforming the arm ends of the connector onto an insert 20. This is precisely the achievement of the present invention.

Attention is now directed to FIG. 2, which shows a tubing assembly 110 of the present invention. Because many of the aspects of the present invention are achieved through the unique properties of the materials used to form them, it is appropriate to discuss those materials in more detail. Both of the present inventors are inventors in patents involving the use of the properties of crosslinkable polyethylene. This material, which is commonly referred to as "PEX", is the preferred material, but other materials possessing the required properties may allow practice of the present invention. For example, it may be possible to obtain the inventive effect with polypropylene, commonly referred to as "PPR". PEX may be extruded into tubes while in an uncrosslinked condition, during which it acts as a thermoplastic. The extruded tube may be formed into shapes and then crosslinked, using a variety of known crosslinking techniques, to permanently set the shapes into the PEX tube, which retains a sufficient amount of elasticity to be deformably compressed between a crimp ring and an insert to provide a leak-free seal. The PEX material may also be injection molded from a melt in an effectively uncrosslinked condition in conventional molding equipment to impart a shape to the connector formed, which is then permanently set by crosslinking, again by conventional techniques. By "effectively uncrosslinked", we recognize that the very act of molding the material will result in some small amount of crosslinking, but that the final and critical crosslinking occurs after the material has been formed into the final desired shape. Additional aspects of the preferred embodiment of the invention may be imparted to the connector being formed during the shaping process, as will be discussed in more detail below.

In FIG. 2, the tubing assembly 110 of the present invention is shown with a "L" shape connector 112 being substituted for the prior art straight tube 12 shown in FIG. 1. While the "L" shape shown is a two-ended version of a connector 112 useful in the present invention, there are many other known shapes which can be molded using the technique described above, including the three-ended connectors generally referred to as "T" or "Y" connectors, and the four-ended connector known as a "cross" or an "X." Although not commonly used, it is certainly possible to have more than four ends on connector 112. In the preferred embodiments, the connector 112 will be sized to match the internal and external diameters of the tubing with which it will be used, thereby allowing a symmetrical insert 20 and the same size crimp ring 30 to be used on both sides of the connection. The most commonly encountered sizes of tubes with which this invention is anticipated as being used are the nominal ⅜-inch and ½-inch internal diameter tubes, although the invention is certainly not limited to those sizes.

The connector 112 which is used in the present invention for joining at least two tubes 12, 14 will have a central portion 115 and a plurality of arm ends 116, one such arm end at a distal end of each of a plurality of arms 117. The arms 117 have a proximal end integral with the central portion 115. Typically, one arm end 116 will be paired with each tube end 16 of the tubes (such as 12, 14 in FIG. 2) to be joined in the assembly 110. The connector 112 has an internal conduit 118 communicating the arm ends 116, such that the internal conduit in the central portion 115 has a permanently formed feature 119 therein. In the particular case shown with an "L" connector, the permanently formed feature 119 is the 90° bend in the internal conduit 118. Clearly, the other connectors 112 within the scope of the invention may have a different permanently formed feature. For example, the connector 112 shown in FIGS. 3 and 4 is a "T"shaped three-armed connector, with the permanently formed feature 119 being the intersecting internal conduits. In FIG. 5, connector 112' not only has a 90° bend, but it also has reducing internal and external diameters, so the connector is referred to as a "reducing elbow." In connector 112', the permanently formed feature 119' is the combination of the angular bend and the reducing size. While not specifically illustrated, smooth size reduction of the type shown in FIG. 5 would also be considered a permanently formed feature absent the angular diversion.

Once the connector 112 is provided, FIG. 2 shows that the tubing assembly 110 may be formed through exactly the same joining process taught with respect to FIG. 1. The preferred embodiments of the present invention will incorporate a connector 112 which has sufficient structural rigidity to allow the permanently formed feature 119 in the central portion 115 while retaining sufficient elasticity in the arm ends 116 so that they may be deformed onto the insert 20 by a crimp ring 30. This requirement is met by a connector formed from PEX, as well as other materials which may exist or be subsequently invented.

To make the tubing assembly as uniform as possible in physical properties and appearance, it will be highly preferred, although not required, to use the identical PEX or other conforming material for the tubes 12,14 which are joined to the connector 112 at the arm ends 116.

A yet further aspect of the present invention is shown in FIGS. 3 through 5. When the tube ends 16 and the arm ends 116 are molded to the size required, the ends 16, 116 may be being smoothly radiused, facilitating easy insertion of the crimp ring 30 over the tube end. Since these ends 16,116 are preformed and not intended to be cut in the field, they may be provided with a further feature that facilitates use of the crimp ring 30. In FIGS. 3–5, the crimp ring 30 and insert 20 are unchanged from the prior art descriptions of FIG. 1. However, changes have been made to the tube 12 and the connector 112 to create a crimp ring seat 140, as will be described now. These changes are typically made during the molding process in which the tube 12 or connector 112 is formed. Between FIGS. 3–5, this crimp ring seat 140 may be viewed from the top, side and end.

The first step is to mold a stop 142 into the tube 12 or connector 112. This stop 142 may be provided in a variety of shapes. A very utile first embodiment thereof is shown in FIGS. 3 and 4, where the stop is shown as a pair of diametrically-opposed ramp-like expansions 142a, 142b of the tube diameter, each of which covers only a few degrees of the tube circumference, an aspect best seen in the end view provided in the middle of FIG. 4. The ramp-like expansion 142 increases in diameter as one moves distally toward the tube end 16 (or connector end 116), with an abrupt decrease in the diameter effectively creating a stop face 144. The stop face 144 is axially positioned along the tube 12 or connector 112 so a crimp ring 30 which is properly positioned to secure an insert 20 will abut the stop face 144 (as is shown in FIG. 5) and allow a short portion of the tube end 16 or connector arm end 116 to be exposed distal of the crimp ring. The stop face feature taught is not limited to the embodiment shown. While FIGS. 3 and 4 show a single pair of the ramp-like expansions 142a, 142b, covering only a few degrees of the tube circumference to form stop 142, it will be within the scope of the present invention to widen the angular extent of these expansions, or to provide additional diametrically-opposed pairs, or even to provide angularly-balanced sets of three or five such expansions 142 around the circumference. Angular balance of the stop 142 is critical. When angular balance is provided, the crimp ring 30 placed on the connector end 116 will have its longitudinal axis parallel to the longitudinal axis of the tube 12 or connector 112 on which it is seated. Most preferably, the crimp ring 30 will not only be parallel, but will be co-axial. This helps to prevent the common problem of deforming a crimp ring 30 which is in an oblique or "cocked" relationship to the tube 12 or connector 112. For these reasons, the most preferred number of stops 142 acting as a set may be four. Deforming the crimp ring 30 in an oblique position can result in an improper fit and seal and may result in leakage or other failure. At the point of its maximum extent, the height of the stop face 144 will preferably be about the external diameter of the crimp ring 30. The stop face 144 is intended to prevent the crimp ring 30 from slidingly passing along the tube beyond the stop face.

A second step to creating the crimp ring seat is to form at least one crush rib 146 on the tube 12 or connector 112, starting at or near the stop face 144 and extending longitudinally to the tube end 16 or connector end 116, that is, distally of the stop face. In the embodiment shown, having a pair of diametrically-opposed ramp-like expansions 142a, 142b, it is preferred to provide one crush rib 146 with each ramp-like expansion. Upon casual visual inspection, the crush ribs 146 as shown resemble accidental parting-line flashing from the mold and may not be perceived to have intentional function. The ribs 146 extend outwardly only a slight distance from the external surface of the tube or connector. However, particularly when acting in diametrically-opposed pairs, the ribs 146 slightly increase the effective diameter of the tube between the stop face 144 and the tube end 16. This can convert a sliding fit between the internal diameter of crimp ring 30 on the tube 12 into a very slight interference fit, occasioned by the crush ribs 146. The fit allows the crimp ring 30 to be freely placed onto the tube 12 without use of force, but is sufficient to retain the crimp ring on the tube even when the tube has its axis oriented vertically. Without the crush rib 146, a crimp ring 30 in sliding fit would slide off of the tube 12 when the tube axis is vertically oriented. While the embodiment shown has one crush rib 146 matched up with each of the two ramp-like expansions 142, it is also possible to as few as one may be used and certainly more than two may be used. These crush ribs 146 would not need to be aligned with the expansions 142 in the manner shown in Figures.

Viewed together, then, stop face 144 and crush rib 146 co-act to create a crimp ring seat 140 on the exterior surface at the end of tube 12 or connector 112. When provided, this seat 140 allows a crimp ring 30 to be properly positioned on the tube 12 for securing the insert 20 without requiring the crimp ring to be held in place by the installer. Use of the crimp ring seat 140 results in a consistently attractive and effective installation of the fittings. There is less loss of crimp rings 30 from having them slide off of the tube 12. There is also less leakage or failure of the connection due to crimping of an improperly-seated crimp ring. Since the crimp ring 30 is effectively positioned by the stop face 144 and held in place by the crush rib 146, it may be possible in certain applications to sell the a tube 12 or a connector 112 with the insert 20 fitted into the tube end and a crimp ring 30 already positioned.

A limitation of the present invention is that the proper placement on the crimp ring seat 140 on a tube 12 requires the stop face 144 to be accurately spaced from tube end 16. If the tube 12 must be custom-cut in the field, it is not possible to make this determination in advance. However, in pre-formed molded pieces such as "L" or "T" shaped pieces, as well as straight pieces of predetermined length, the tube ends may be provided with the crimp ring seat feature 140 of the present invention.

While the crimp ring seat 140 feature as just described has its preferred use made in association with a tubing assembly 110 of the present invention, it is not limited thereto, and may be used with a tubing assembly 10 of the prior art, or other known tubing assemblies using a crimp ring 30 and insert 20.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A tubing assembly, comprising:
   at least two tubes, each tube having a tube end and an internal conduit;
   a connector for joining the at least two said tubes, the connector comprising a central portion with an internal conduit having a permanently formed feature therein, and a plurality of arms, each arm extending from the central portion and terminating in an arm end, such that there is one arm and arm end aired with each said tube end, with the connector internal conduit extending through the arms to the respective arm ends;
   a plurality of linear inserts, such that there is one linear insert for each arm end/tube end pair, a first nipple portion of each said linear insert having an external surface frictionally engaged in an internal surface of the connector internal conduit at the arm end and a second nipple portion of each said linear insert having an external surface frictionally engaged in an internal surface of the tube internal conduit at the tube end;
   a plurality of ring members, such that one said ring member is slidingly received along each tube end or arm end atop one of the linear inserts frictionally engaged therein, the ring member compressively deforming the respective tube end or arm end onto the linear insert, joining the connector internal conduit to the tube internal conduit in a leak-free manner; and
   wherein a seat is formed on at least one arm of the connector for receiving one of the plurality of ring members prior to the deformation thereof against the connector arm, and further wherein the seat comprises a stop face to align the ring member coaxially with the connector arm wherein the stop face is defined by at least two ramp-like expansions of the diameter of the connector arm.

2. The tubing assembly of claim 1 wherein the permanently formed feature is selected from the group consisting of an angular diversion, an intersecting conduit, a smooth reduction of the internal and external diameters, and combinations thereof.

3. The tubing assembly of claim 1 wherein the connector is molded unitarily from a polymeric material.

4. The tubing assembly of claim 3 wherein the polymeric material is crosslinkable.

5. The tubing assembly of claim 4 wherein the crosslinkable polymeric material is polyethylene.

6. The tubing assembly of claim 1 wherein the connector has two arms.

7. The tubing assembly of claim 1 wherein the connector has three arms.

8. The tubing assembly of claim 7 wherein the arms are arranged in a "T" shape.

9. The tubing assembly of claim 7 wherein the arms are arranged in a "Y" shape.

10. The tubing assembly of claim 1 wherein the connector has four arms.

11. The tubing assembly of claim 1 wherein at least one of the at least two said tubes is an arm of a further connector as defined in claim 1.

12. The tubing assembly of claim1 wherein the connector is a linear reducer.

13. The tubing assembly of claim 1 wherein the connector is a reducing elbow.

14. The tubing assembly of claim 1 wherein the at least two ramp expansions are angularly balanced around the circumference of the connector arm.

15. The tubing assembly of claim 1 wherein the stop face is axially positioned along the connector arm so that when the ring member abuts against the stop face, the ring member is aligned with the insert to form a leak-free seal upon the compressive deformation of the ring member.

16. The tubing assembly of claim 1 wherein at least one crush rib is formed on the connector arm at the ring seat, the crush rib increasing the external diameter of the connector arm to frictionally engage the ring member.

* * * * *